(12) United States Patent
Ammann

(10) Patent No.: US 6,633,373 B2
(45) Date of Patent: Oct. 14, 2003

(54) LEVELING DEVICE FOR A LEVELING INSTRUMENT EMITTING AT LEAST TWO LIGHT BEAMS

(75) Inventor: Hans-Rudolf Ammann, Amriswil (CH)

(73) Assignee: Ammann Lasertechnik AG, Amriswil (CH)

( * ) Notice: Subject to any disclaimer, the term of this patent is extended or adjusted under 35 U.S.C. 154(b) by 148 days.

(21) Appl. No.: 09/726,465

(22) Filed: Nov. 29, 2000

(65) Prior Publication Data

US 2001/0004287 A1 Jun. 21, 2001

(30) Foreign Application Priority Data

Dec. 16, 1999 (CH) ................................. 2307/99

(51) Int. Cl.[7] .................................................. G01C 5/00
(52) U.S. Cl. .................................................... 356/138
(58) Field of Search .............................. 356/5.09, 138; 33/286, 276; 172/2; 250/208.1; 359/629

(56) References Cited

U.S. PATENT DOCUMENTS 3,907,435 A * 9/1975 Roodvoets ................... 356/153
5,313,409 A * 5/1994 Wiklund et al. ............. 356/556
6,262,801 B1 * 7/2001 Shibuya et al. ......... 356/139.08

* cited by examiner

*Primary Examiner*—John R. Lee
*Assistant Examiner*—Phillip A Johnston
(74) *Attorney, Agent, or Firm*—Bachman & LaPointe, P.C.

(57) ABSTRACT

A receiver serves to determine a position in relation to a surveying leveling instrument emitting at least two light beams, one light beam rotating at least partially about an approximately horizontal axis and the other light beam rotating at least partially about an approximately vertical axis. The receiver has two receiving regions, i.e. one for each of the two light beams. The receiving regions preferably consist of two rows of light-sensitive elements, for example photocells, intersecting at a center. An additional element in each case is provided upstream of the receiving regions in the direction of passage of the light beam. As a result of this, one of the two receiving regions can either be switched on or off in each case, so in each case only the light beam associated with a receiving region is detected and/or displayed. The receiving device has LED displays arranged in accordance with the receiving regions of the receiver. The accuracy and potential uses of the leveling device are improved considerably as a result of the invention.

17 Claims, 3 Drawing Sheets

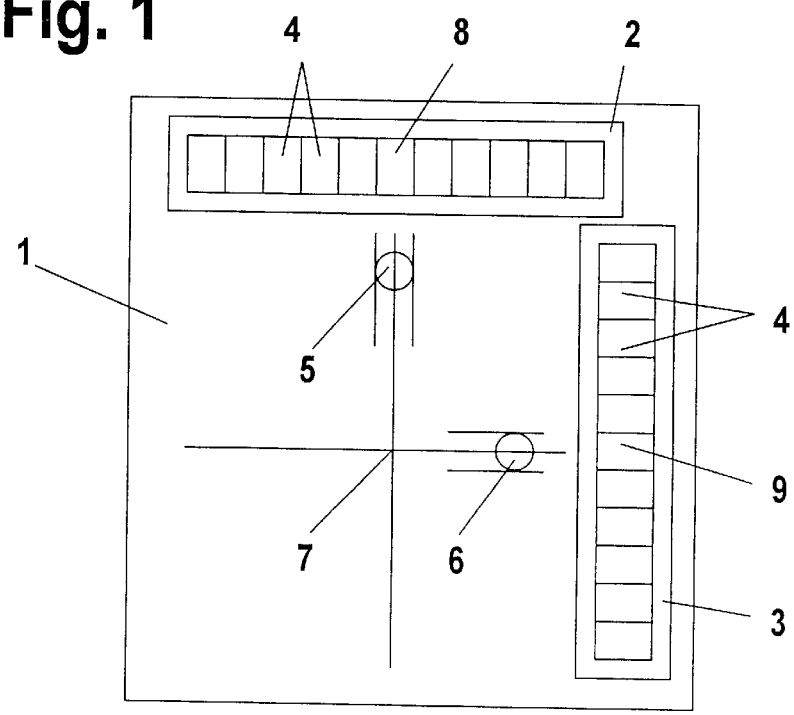
Fig. 1
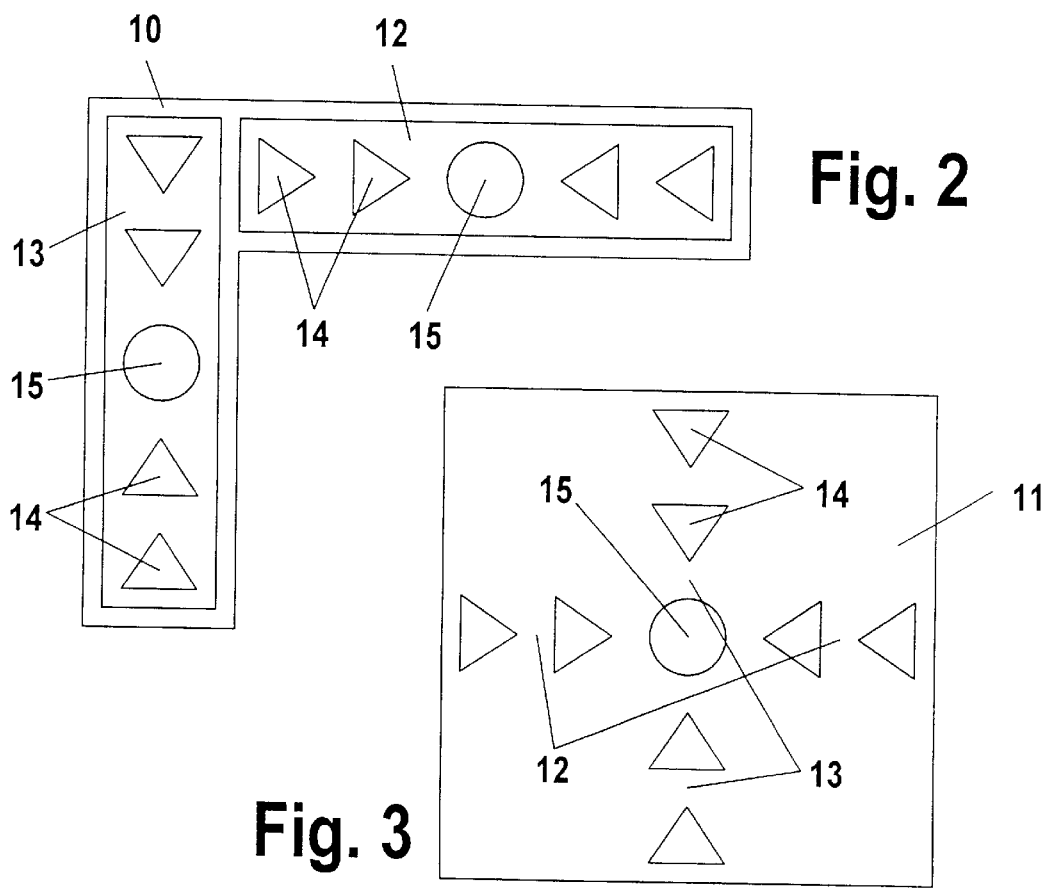
Fig. 2
Fig. 3

LEVELING DEVICE FOR A LEVELING INSTRUMENT EMITTING AT LEAST TWO LIGHT BEAMS

FIELD OF THE INVENTION

The present invention relates to a leveling device with at least one receiver for determining a position in relation to a leveling instrument emitting at least two light beams, the one light beam rotating at least partially about an approximately horizontal axis A—A and the other light beam rotating at least partially about an approximately vertical axis B—B.

BACKGROUND OF THE INVENTION

Instruments for measuring or marking a plane which operate by means of a laser beam are known. Normally, a suitable receiver is required for receiving the laser beam or laser light. Such laser beam leveling instruments which can be used for construction purposes have means for producing a laser beam and a rotatable head emitting the laser beam. The laser beam which, like a lighthouse light, is set into a rotating movement forms the measuring plane, which can be used for measuring purposes and is horizontal or inclined by a desired percentage. The laser beam can be received at any point round the laser beam leveling instrument by means of the receiver. As a result, the inclination of the imaginary plane between the laser beam leveling instrument and the receiver can be measured. Such a laser beam leveling instrument is used inter alia in earth excavation and in the planning of foundations, in the controlling of concrete foundations, in the leveling of sliding parts for cranes etc. If, for example, a car park is to be located on a gradient which guarantees drainage, monitoring or control work can be performed with the aid of the receiver secured to a leveling rod.

The applicant has developed laser beam leveling instruments which not only emit a laser beam rotating in an approximately horizontal plane, i.e. about a first axis B—B, but furthermore, a second laser beam, which is approximately at right angles to the first one and rotates vertically about a second axis A—A. In such an instrument, reflecting means are provided above a head rotating in the axis A—A, which reflecting means rotate about the other axis B—B. In a second instrument proposed by the applicant, two separate rotating heads are provided. The two emitted laser beams intersect at a specific point in each case. The instruments can be economically designed such that both laser beams are produced by a single light source. It is evident that working with two laser beams provides a number of advantages and new possibilities.

Receivers which have light-sensitive elements, in particular photocells, are known. LED displays, for example LEDs, are placed on the receiver itself or on a display device which can be erected separately, and indicate which photocell the light beam impinges. Therefore the position of the light beam impinging upon the receiver can be read off the display device.

When working with the above-mentioned laser beam leveling instruments with two laser beams, measuring problems result however as the receiver cannot recognize which of the two laser beams it is actually receiving. Therefore greater demands are placed on the experience and attentiveness of the operator to draw the correct conclusions from the sometimes confusing flashing of the display device.

OBJECT OF THE INVENTION

The object of the invention therefore is to improve a leveling device of the type mentioned at the beginning so that two light beams rotating about different axes A—A and B—B can be received reliably and accurately by the receiver.

SUMMARY OF THE INVENTION

According to the invention there is provided a leveling device having at least one receiver for determining a position in relation to a leveling instrument emitting at least two light beams, the one light beam rotating at least partially about a substantially horizontal axis and the other light beam rotating at least partially about a substantially vertical axis, the improvement being that the receiver is provided with two light-sensitive or light-reflecting receiving regions, each receiving region being provided for receiving one of the two light beams.

BRIEF DESCRIPTION OF THE DRAWINGS

Embodiments of the invention will now be described in more detail below with the aid of the drawings, in which:

FIG. 1 shows a first embodiment of a receiver forming part of a leveling device according to the invention;

FIG. 2 shows one embodiment of a display device forming part of a leveling device according to the invention;

FIG. 3 shows another embodiment of a display device;

DESCRIPTION OF THE PREFERRED EMBODIMENTS

Figure 4:
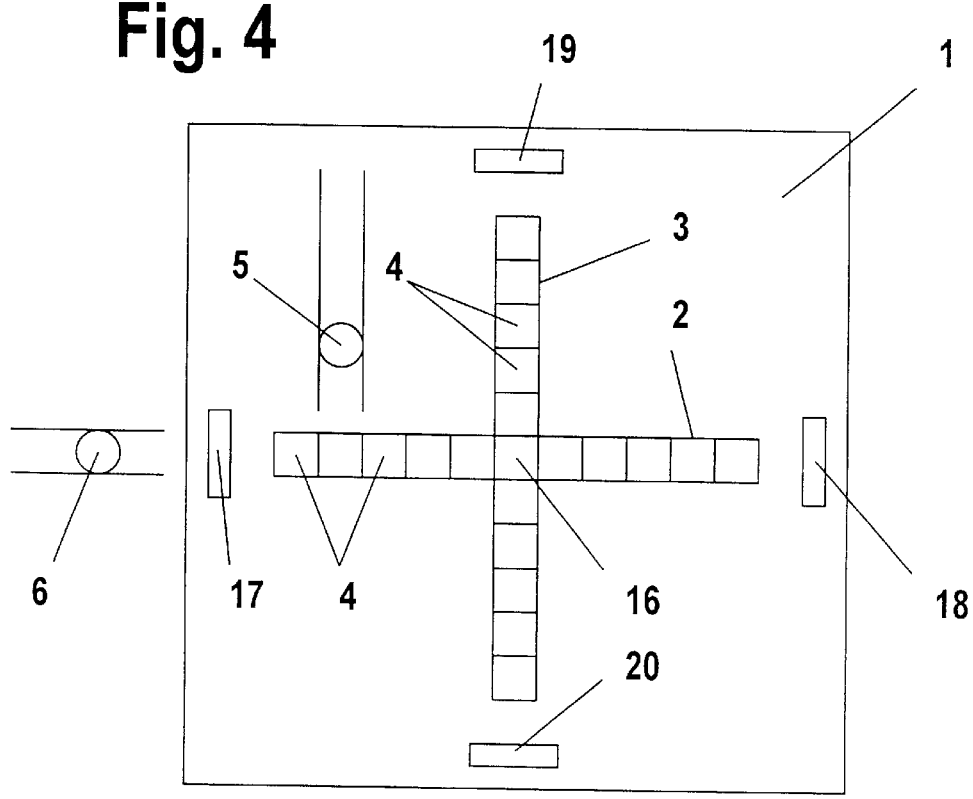
FIGS. 4 and 5 show further embodiments of receivers.

The receiver 1 according to FIG. 1 has two light-sensitive receiving regions 2 and 3, in the form of two rows of light-sensitive elements 4, preferably photocells. Each receiving region 2 and 3, or each row, is provided for receiving a light or laser beam 5 or 6. It is also noted that it is simple to adjust the leveling instrument emitting the light or laser beams 5 and 6 such that the two beams do not impinge upon the receiver 1 simultaneously in each case, so that only one beam is received at any one time. The two light or laser beams 5 and 6 therefore pass the receiver 1 or the point of intersection of their path of rotation or path of partial rotation not simultaneously but in succession.

The upper light-sensitive receiving region 2 or the upper horizontally arranged row is intended to receive a vertical light or laser beam 5, i.e. a light or laser beam rotating about an approximately horizontal axis A—A. This impinges upon the receiver 1 in the form of a light spot. The light spot moves rapidly across the face of the receiver 1 either from top to bottom or from bottom to top. The second light-sensitive receiving region 3 or the second vertical row arranged at right angles to the first row is intended to receive the usual light or laser beam 6 which is approximately horizontal, i.e. rotating about a vertical axis B—B. Its light point passes the receiver 1 either from left to right or vice versa depending on the direction of rotation of the laser beam leveling instrument. The movements of the two light or laser beams 5 and 6 can be seen in FIG. 6. If the point of intersection 7 of the two light or laser beams 5 and 6 is located on the intended target on the receiver 1, then this point of intersection is aligned exactly with the laser beam leveling instrument. In the present example this applies when the one light or laser beam 5 passes the central light-sensitive element 8 of the upper receiving region 2 or of the upper row and the other light or laser beam 6 passes the central light-sensitive element 9 of the lateral receiving region 3 or of the lateral row.

The impingement of the two light or laser beams 5 and 6 can be seen by the operator on a display device 10 or 11, see FIGS. 2 and 3. The display device 10 or 11 can be designed as a part of the receiver 1 or of the leveling instrument emitting the light or laser beams 5 and 6 or as a third separate instrument. In the first embodiment according to FIG. 2 a separate display region 12 and 13 or a separate display row is provided for each light or laser beam 5 or 6, i.e. for each receiving region 2 or 3 or for each row of the light-sensitive elements 4. The individual LED displays 14, for example LEDs, indicate which light-sensitive element 4, or photocell, the light beam is impinging upon. For the sake of simplicity it is also possible, as illustrated, to provide fewer LED displays 14 as the direction of deflection is of greatest importance for the operator. If the light beam impinges directly in the center, the central LED display 15 lights up. The lateral LED displays 14 can be designed as arrows or triangles which point towards the center. The central LED display 15 can be designed as a round center. Differently colored LED displays 14 and 15 are also conceivable. In the embodiment according to FIG. 3 control of centering of the light or laser beam 5 and 6 is even simpler as the two rows of LED displays meet at a common center and only one central LED display 15 is provided. In this embodiment it would be conceivable to connect the central LED display 15 in such a way that it can be detected whether the two light or laser beams 5 and 6 are centered. This LED display 15 could, for example, either light up permanently or flash depending on whether one or both light or laser beams 5 and 6 are central.

Figure 5:
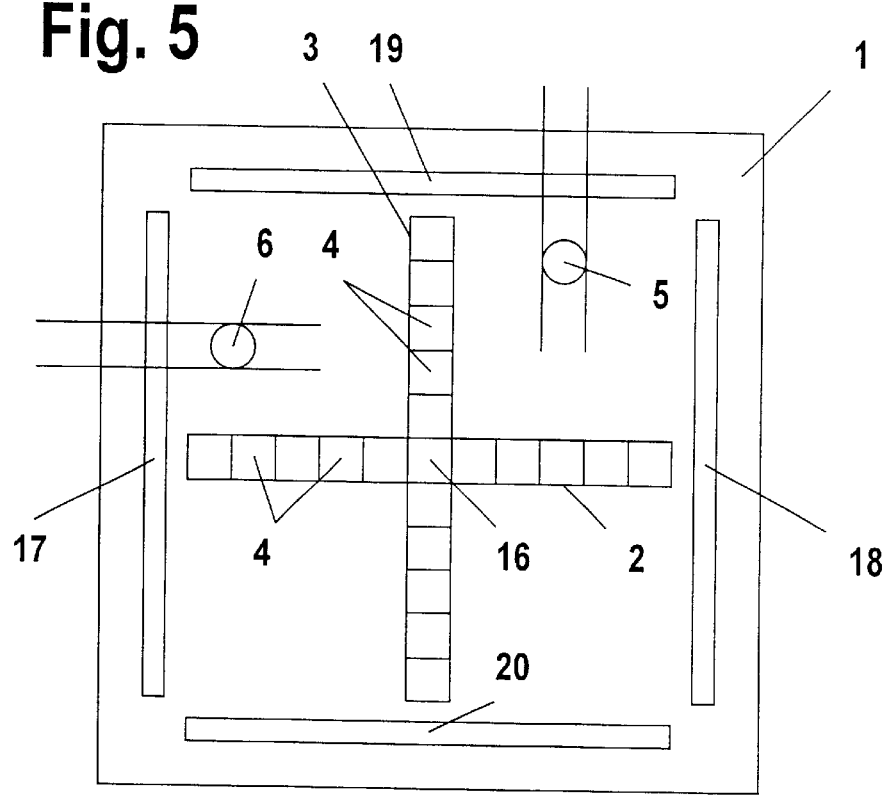

Back to the actual matter of the invention: the problem of distinguishing whether the horizontally rotating or vertically rotating light or laser beam 5 or 6 is impinging upon a receiving region 2 or 3 or a row of light-sensitive elements is solved even more satisfactorily in the two preferred embodiments according to FIGS. 4 and 5. In this case, two receiving regions 2 and 3, i.e. rows of light-sensitive elements 4, or photocells, arranged at right angles to one another intersect on the receiver 1 at a common center 16. In addition, elements 17, 18, 19 and 20 which are also designed in this case so as to be light-sensitive, and each of which is associated with an end of the two receiving regions 2 and 3, or rows of light-sensitive elements 4 are provided. The two embodiments according to FIGS. 4 and 5 differ in the length of these light-sensitive elements 17, 18, 19 and 20. These additional light-sensitive elements 17, 18, 19 and 20 are arranged in such a way that the passing light or laser beam 5 or 6 initially impinges upon such a light-sensitive element 17 or 19 in each case and finally passes the second light-sensitive element 18 or 20 of the respective pairing before leaving the region of the receiver 1. The light-sensitive elements 17 and 18, or 19 and 20 are connected in terms of control engineering to the respective receiving region 2 or 3 or the respective row of light-sensitive elements 4.

The purpose of this device is as follows: if, for example, the horizontally rotating light or laser beam 6 impinges precisely in the center, then it would travel over the horizontal receiving region 2 or the horizontal row of light-sensitive elements 4. This, however, is intended for deflecting the vertically rotating light or laser beam 5 as one wishes in this case to determine whether it is centered. In the present case therefore, the horizontally rotating light or laser beam 6 would travel over all light-sensitive elements 4 of the incorrect receiving region 2, or the incorrect row and cause a disruptive and incorrect display. The operator would be confused as a result and could draw the wrong conclusions. Since the light or laser beam 6 initially impinges upon the additional light-sensitive element 17, however, this problem can be effectively counteracted. The light-sensitive element 17 is connected in terms of control engineering to the receiving region 2. It is now possible to design the receiver in such a way that as soon as the light or laser beam 6 impinges upon this additional light-sensitive element 17 the receiving region 2 is switched off. This receiving region 2 is then only switched on again when the light or laser beam 6 impinges upon the second light-sensitive element 18 of this pairing. The light-sensitive elements 4 of this receiving region 2 or of this row do not react therefore to this passage of the light or laser beam 6 and therefore cannot trigger any incorrect displays. Only the correct receiving region or the correct row, i.e. in this case the central light-sensitive element 16, reacts. The correct display is produced such that the light or laser beam 6 is centered in relation to the receiving region 3 or in the vertical row. The same thing happens with the light or laser beam 5 and the receiving region 3 or the vertical row 3 and the light-sensitive elements 19 and 20 associated therewith. The latter serve to switch the light-sensitive elements 4 of the receiving region 3 off and on, so the receiving region cannot be disturbed by the second light or laser beam 5.

In addition to the previously described variations, various others are also possible in relation to the additional light-sensitive elements 17, 18, 19 and 20 and their connection in terms of control engineering. Therefore it would be conceivable to provide only a single additional element 17 and 19 at the start of the receiving region 2 and 3 or the row of light-sensitive elements 4 in each case. The control device could be connected in such a way that after the light or laser beam 5 or 6 has switched off, the relevant receiving region 2 or 3 or the relevant row of light-sensitive elements 4 by passing the light-sensitive element 17 or 19, this automatically turns itself on again. As only a very brief moment of switching-off is sufficient, the normal reaction time could be sufficient to prevent disruptive signals in this receiving region 2 or 3 in this brief period. It is noted that switching-off of a receiving region 2 or 3 can also be understood to mean only the suppression of the corresponding signal or display by the display device 11 or 12.

The opposite way is also possible: the additional light-sensitive elements 17, 18, 19 and 20—or also only 17 and 19—are connected in such a way that they do not switch off the incorrect receiving region 2 or 3 or the incorrect row of light-sensitive elements 4, but rather switch on the correct receiving region 2 or 3. The embodiment according to FIG. 5 is particularly suitable for this. If, for example, a light or laser beam passes the light-sensitive element 17, the receiving region 3 switches on in order to check the centering of the light or laser beam 6 and optionally switches off again if the element 18 is struck. The same thing would occur with regard to the element 19 and optionally 20 and the receiving region 2 when the other light or laser beam 5 passed.

Figure 6:
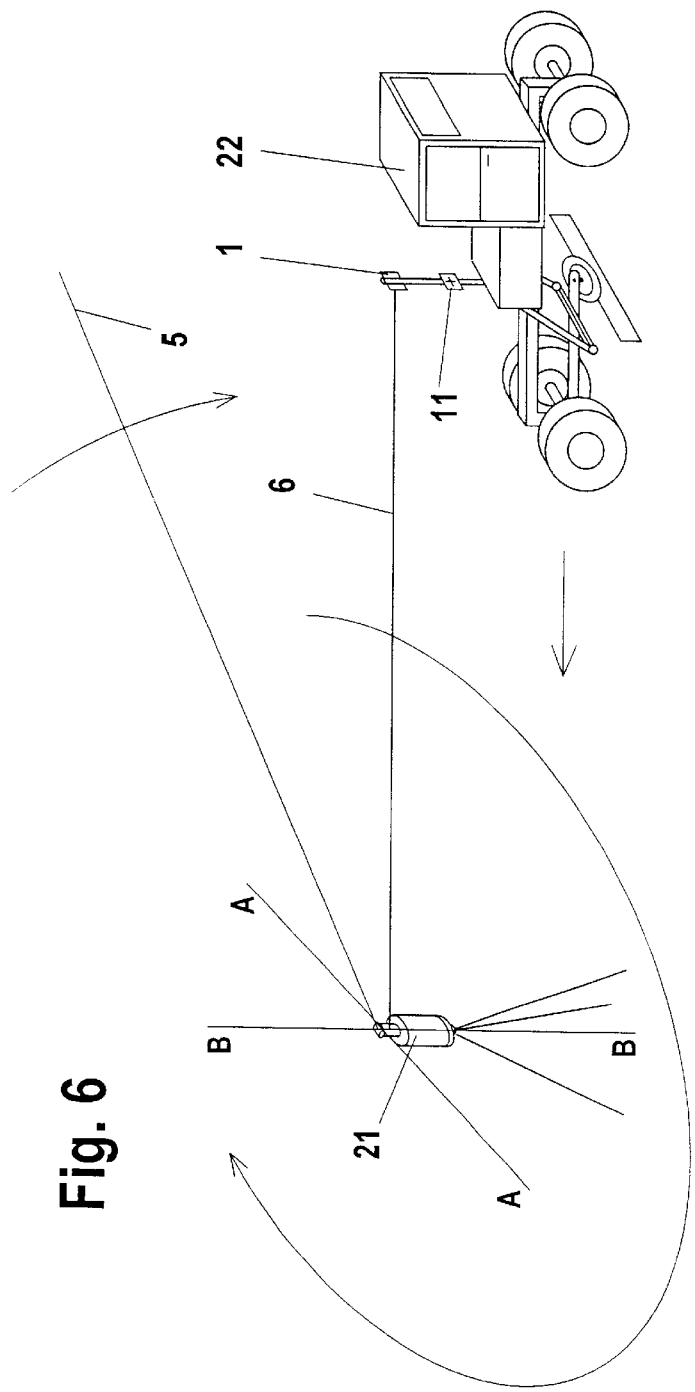
FIG. 6 illustrates the mode of operation of a leveling device according to the invention.

FIG. 6 illustrates the mode of operation of the receiver 1 together with a leveling instrument 21 emitting two light or laser beams 5 and 6. In this example, the arrangement serves to control a leveling machine 22. The one light or laser beam 6 rotates either exactly horizontally about an axis B—B or at a predetermined inclination. The other light or laser beam 5 is pivoted about an axis A—A in such a way that it passes the region of the receiver 1 vertically from the top to the bottom. Of course reverse directions of rotation or pivoting and/or partial rotating or pivoting movements, i.e. corresponding to a graduated circle, are also possible. The driver of the leveling machine 22 can detect on the display device 11 whether he is controlling the machine correctly or whether he needs to correct the direction of travel and/or remove more soil. It is also possible, however, to connect the receiver 1 in terms of control engineering to the control device of the leveling machine 22 in such a way that the latter is controlled automatically. In this way it can be ensured, for example, that a field or car park has a slight gradient which assists drainage in precisely the desired direction. This gradient can be adjusted on the leveling instrument in known manner by slight tilting of the rotational axis B—B. The concept vertical axis B—B is therefore not absolute but rather to be understood merely in order to differentiate this axis B—B from the second approximately horizontal rotational axis A—A.

Of course embodiments other than those described above are also possible, therefore, for example, the number and design of the light-sensitive elements 4, 8, 9, 16 or also 17, 18, 19 and 20 can be determined at will.

A further embodiment of the receiver 1 could be designed in such a way that the receiving regions 2 and 3 or their individual elements 4 and the elements 17, 18, 19 and 20 consist of reflecting means. This means that these reflecting means do not receive the respective light or laser beam 5 or 6 and communicate these electrically to a display device 10 or 11 connected to the receiver 1, but reflect the incoming light or laser beam 5 or 6 back to the leveling instrument 21 again in mirror-like manner. Leveling instruments which can receive and evaluate a reflected light or laser beam again are known technically both by the applicant and by other manufacturers. To evaluate the position of the light or laser beam 5 or 6 on the receiver 1 accurately, it is necessary that the reflecting means replacing the individual elements 4, 17, 18, 19 and 20 reflect the light or laser beam 5 or 6 in a different way, so the leveling instrument can detect which part of which receiving region 2 or 3 is currently reflecting the light or laser beam 5.

The technology of the various reflections and of the receiving and evaluation hereof is known, for example from U.S. Pat. No. 5,784,155. A detailed description is therefore dispensed with at this point. The most recent state of the art, however, has nothing to do with the subject of the present invention. The emitting of two different light or laser beams 5 and 6 by a single leveling instrument, its reception, its differentiation and the evaluation of its position is not known from the above-mentioned state of the art.

Figure 7:
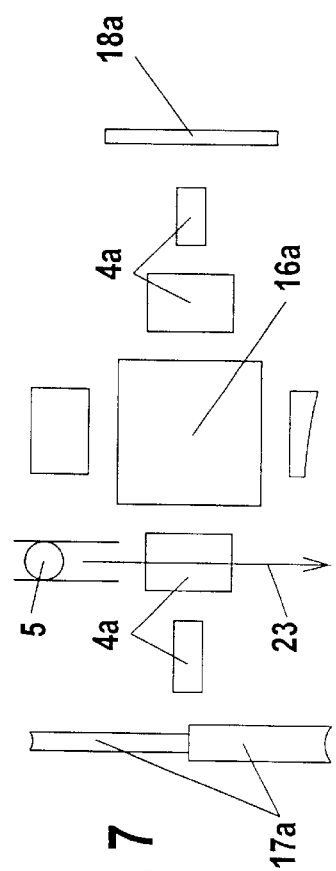
FIG. 7 shows another embodiment of a receiver forming part of a leveling device according to the invention.

FIG. 7 shows schematically the conversion of the light or laser beam reflection in a receiver according to the invention. For the sake of simplicity, only the part corresponding to the receiving region 2 of similar examples according to FIGS. 4 and 5 is illustrated. The elements 4a, 16a, 17a and 18a are reflecting means of various designs. In this example the individual light-reflecting elements 4a, 16a, 17a and 18a are of different lengths in relation to the direction of passage 23 of the impinging light or laser beam 5. As a result, a light pulse of differing length is reflected back to the leveling instrument 21, depending on which element 4a or 16a the light or laser beam 5 impinges. The length of the light pulse can be evaluated by the control device for determining the individual element 4a or 16a. Owing to the appropriate design of the first element in each case, i.e. of the uppermost element (not shown) and of the first lateral element 17a in this case, the control device can detect from which side of the center 16a the light or laser beam 5 passes. In this example detection is made by a different width of first element 17a on the one side and on the other side of the center. The first element 17a in each case can interact with the control device in this case in such a way that the latter detects whether the vertically or horizontally rotating light or laser beam 5 or 6 is passing and whether this is to the left or right of or above or below the center. In the present embodiment it is also conceivable, however, that as a result of the different dimensions of the length and width of the elements 4a the light pulses triggered as a result which are reflected in different ways, enable the control device to detect each element 4a on the receiver 1. The switching on and off of the evaluation of the light or laser beam 5 impinging upon the receiver 1 and reflected thereby is made in the present case in the leveling instrument 21. A specific reflecting signal would therefore switch off or suppress—in accordance with the signals of the light-sensitive elements 4–20 of the embodiments previously described—the position signal of the light or laser beam 5 or 6. In terms of control engineering there is hardly any difference in comparison with the other embodiments. The display device 10 or 11 could be arranged on the leveling instrument 21 or could interact therewith by means of a wire or wireless connection.

In a further embodiment of the receiver 1 the correct laser beam 5 or 6 is recognized electronically in each case. This is ensured in that a control device is designed in such a way that it recognizes when a laser beam 5 or 6 does not travel transversely or at a right angle across a receiving region 2 or 3, but lengthways, i.e. across the entire row of light-sensitive elements 4. If the latter is the case then it is clearly the incorrect laser beam 5 or 6. The control device can therefore differentiate whether the signals coming from the elements 4 are triggered by the correct or incorrect laser beam 5 or 6. To this end the control device can be designed, for example, in such a way that a laser beam 5 or 6 signaled by the elements 4 is incorrect if the signals come from two or more elements 4. As the laser beam 5 or 6 passes relatively rapidly over the receiver 1 these signals come at relatively short intervals, almost simultaneously even. In this embodiment the two receiving regions 2 and 3 can be arranged as in the example according to FIG. 1 or also as in the examples according to FIGS. 4 and 5. In the latter case, of course, without the additional elements 17–20. The control device is preferably designed in such a way that a laser beam 5 or 6 detected as incorrect is not signaled to the display device 10 or 11. The operator therefore notices nothing of the incorrect signals and cannot be disturbed or confused as a result.

The accuracy of the measurement and the control of the alignment as well as the potential uses of the leveling device are improved considerably in comparison with the previously known state of the art as a result of the invention.

The features of the above-mentioned embodiments can be modified or freely combined with one another within the scope of the invention as defined by the following claims.

I claim:

1. In a leveling device comprising at least one receiver for determining a position in relation to a leveling instrument emitting at least two light beams from at least two separate emitting sources, one light beam rotating at least partially about a substantially horizontal axis and an other light beam rotating at least partially about a substantially vertical axis, wherein the receiver is provided with two light receiving regions, each light receiving region being provided for receiving one of the two separate light beams.

2. A leveling device according to claim 1, wherein the two light receiving regions comprise two light-sensitive receiving regions each comprising a series of light-sensitive elements.

3. A leveling device according to claim 1, wherein the two light receiving regions of the receiver each consist of a row of light-reflecting elements which reflect the light beams in different ways.

4. A leveling device according to claim 3, wherein the light-reflecting elements are of different dimensions, so the light beam moved across them triggers a different reflected light pulse in each case.

5. A leveling device according to claim 1, wherein the two light receiving regions of the receiver are arranged on the receiver on axes approximately at right angles to one another, the first receiving region being arranged substantially horizontally and the second receiving region being arranged substantially vertically.

6. A leveling device according to claim 5, wherein the two light receiving regions of the receiver are arranged on the receiver in such a way that they intersect one another.

7. A leveling device according to claim 5, wherein the two light receiving regions intersect each other at a point, the point of intersection of the two light receiving regions of the receiver being jointly associated with both receiving regions.

8. A leveling device according to claim 7, wherein the point of intersection serves both light receiving regions.

9. A leveling device according to claim 1, wherein at least one additional element serving to receive a light beam is associated with each receiving region, at least one of these elements being located upstream of a receiving region in the direction of passage of the light beam, wherein these additional elements are connected to a control circuit and/or a display device in such a way that one of the two receiving regions in each case is either switched off and/or switched on or the display of a light beam impinging upon the corresponding receiving region is suppressed.

10. A leveling device according to claim 9, wherein a first additional element arranged upstream of the receiving region in the direction of passage of the light beam is intended to turn one of the two receiving regions either off or on, and to permit or suppress the display of a light beam impinging upon the corresponding receiving region, whilst the second additional element arranged downstream of the receiving region in the direction of passage of the light beam is intended to cancel out the effect of the first element to switch a receiving region which has been switched off on again.

11. A leveling device according to claim 1, wherein at least one additional element serving to receive a light beam is arranged upstream of each receiving region, which element is intended to determine whether the respective light beam passes above or below, or to the left or to the right of the center.

12. A leveling device according to claim 11, wherein a control circuit is provided which is designed in such a way that the effect of the additional element serving to receive a light beam and arranged upstream of each receiving region is cancelled out again after a period of time enabling the light beam to leave the region of the receiver, for example a receiving region which has been switched off is switched on again.

13. A leveling device according to claim 1, wherein a control device is connected to the two receiving regions or to the individual light-sensitive elements for detecting a laser beam which passes lengthways over a receiving region as the incorrect laser beam.

14. A leveling device according to claim 13, wherein the control device is designed in such a way that a laser beam impinging upon a receiving region is the incorrect laser beam if the signals come from two or more rows of light-sensitive elements.

15. A leveling device according to claim 13, wherein the control device is designed in such a way that a laser beam, which has been detected as incorrect, is not signaled to a display device and is therefore not displayed.

16. A leveling device according to claim 1, wherein a display device is provided which has a separate display region for each of the two receiving regions of the receiver, a first approximately horizontally arranged display region being intended for the display of one light beam and the second approximately vertically arranged display region being intended for the display of the other light beam.

17. A leveling device according to claim 16, wherein the two display regions are arranged on the display device in such a way that they intersect one another.

* * * * *